United States Patent

(12) United States Patent
Yan

(10) Patent No.: US 10,112,479 B2
(45) Date of Patent: Oct. 30, 2018

(54) OBSTACLE-ADAPTIVE MECHANISM OF A MOVING DEVICE

(71) Applicant: Jason Yan, New Taipei (TW)

(72) Inventor: Jason Yan, New Taipei (TW)

(*) Notice: Subject to any disclaimer, the term of this patent is extended or adjusted under 35 U.S.C. 154(b) by 225 days.

(21) Appl. No.: 15/077,482

(22) Filed: Mar. 22, 2016

(65) Prior Publication Data

US 2017/0036537 A1 Feb. 9, 2017

(30) Foreign Application Priority Data

Aug. 4, 2015 (TW) .............................. 104125160 A

(51) Int. Cl.
*B60K 17/04* (2006.01)
*B60B 19/00* (2006.01)
*A47L 9/00* (2006.01)

(52) U.S. Cl.
CPC ............ *B60K 17/043* (2013.01); *A47L 9/009* (2013.01); *B60B 19/00* (2013.01); *A47L 2201/00* (2013.01); *B60B 2200/40* (2013.01); *B60B 2900/571* (2013.01); *B60Y 2200/48* (2013.01)

(58) Field of Classification Search
None
See application file for complete search history.

(56) References Cited

U.S. PATENT DOCUMENTS

| 1,446,121 | A | * | 2/1923 | Engstrom | ............. | B60K 17/36 180/6.2 |
| 5,924,503 | A | * | 7/1999 | Lykken | ................ | B60K 17/043 180/6.7 |
| 5,924,506 | A | * | 7/1999 | Perego | ................. | B60K 7/0007 180/252 |
| 2003/0127260 | A1 | * | 7/2003 | Angeles | ................... | B60K 1/02 180/23 |
| 2008/0302586 | A1 | * | 12/2008 | Yan | ......................... | A47L 9/009 180/24.08 |
| 2013/0340201 | A1 | * | 12/2013 | Jang | ......................... | A47L 9/009 15/319 |
| 2014/0110183 | A1 | * | 4/2014 | Rudakevych | ........ | B60K 7/0007 180/9.32 |

FOREIGN PATENT DOCUMENTS

EP 2036755 A2 * 3/2009 .............. B60G 3/01

* cited by examiner

*Primary Examiner* — Justin Holmes
(74) *Attorney, Agent, or Firm* — Chun-Ming Shih

(57) ABSTRACT

The present invention discloses an obstacle-adaptive mechanism of a moving device, which uses a driving wheel, a driving gear, a passive wheel, a passive gear and an intermediate gear as a transmission mechanism, wherein the driving gear is connected to one side of the driving wheel, the passive gear is connected to one side of the passive wheel, the intermediate gear is disposed between the driving gear and the passive gear to keep the driving wheel and the passive wheel rotating in the same direction to help crossing an obstacle, thereby preventing the obstacle-adaptive mechanism from being stuck by the obstacle and allowing the obstacle-adaptive mechanism to successfully crossing the obstacle. Therefore, the obstacle-adaptive mechanism of the moving device can provide the ability for crossing obstacles.

7 Claims, 8 Drawing Sheets

OBSTACLE-ADAPTIVE MECHANISM OF A MOVING DEVICE

BACKGROUND OF THE INVENTION

1. Field of the Invention

The present invention relates to an obstacle-adaptive mechanism which can cross obstacles, and more particularly, to an obstacle-adaptive mechanism of a moving device which can cross obstacles.

2. Description of the Prior Art

As technology advances, obstacle-adaptive mechanisms which can cross obstacles are getting more and more popular in households or offices and complete various tasks according to user demands. However, an obstacle-adaptive mechanism in prior arts is often disposed with a single wheel, which can easily get stuck by the obstacle when the obstacle-adaptive mechanism tries to cross the obstacle, causing troubles to the user.

Besides, some obstacle-adaptive mechanisms of prior arts use caterpillar bands to work with wheels to act as transmission mechanisms. However, the caterpillar band is prone to be loosed from the wheel because of elastic fatigue. The obstacle-adaptive mechanism is therefore dis-functional for crossing the obstacle. Furthermore, the caterpillar band is usually heavy and requires a high-power motor to driven across the obstacle, which leads to a higher manufacturing cost for the obstacle-adaptive mechanisms and raises the requisitions for using these obstacle-adaptive mechanisms.

SUMMARY OF THE INVENTION

An object of the present invention is to provide an obstacle-adaptive mechanism of an obstacle crossing device which is disposed with a driving wheel and a passive wheel, and an intermediate gear disposed between the driving wheel and the passive wheel, thereby preventing the obstacle-adaptive mechanism of the obstacle crossing device from being stuck by the obstacle while maintaining the balance of the obstacle-adaptive mechanism of the moving device. Therefore the obstacle-adaptive mechanism of the moving device can provide enhanced obstacle-crossing ability and fulfills various tasks according to user demands.

The present invention provides an obstacle-adaptive mechanism of a moving device, which comprises a driving wheel, a driving gear, a passive wheel, a passive gear, an intermediate gear and a driving unit, wherein the driving gear is connected to one side of the driving wheel, the passive gear is connected to one side of the passive wheel, the intermediate gear is disposed between the driving gear and the passive gear to keep the driving wheel and the passive wheel rotating in the same direction, the driving gear drives the driving wheel to rotate the intermediate gear, then the intermediate gear drives the passive gear to rotate the passive wheel; and the driving wheel is connected to the driving unit, which drives the driving wheel to keep the driving gear and the passive gear rotating in the same direction.

Furthermore, the outer rims of the driving wheel and the passive wheel are disposed with tires to protect the driving wheel and the passive wheel when the driving wheel and the passive wheel are rolling. The tires can protect the driving wheel and the passive wheel by increasing the friction with the ground and reducing the abrasion of the driving wheel and the passive wheel. Besides, advantages such as strong grip and large contacting area of the tire can facilitate the rolling speed of the driving wheel and the passive wheel to improve the efficiency of the obstacle-adaptive mechanism of the moving device.

The obstacle-adaptive mechanism of the moving device further comprises a wheel case unit, a body, a plurality of shock absorbing units, wherein the wheel case unit comprises the driving wheel, the passive wheel, the driving gear, the passive gear, and the intermediate gear disposed therein to hold the driving wheel and the passive wheel in position and to protect the driving wheel, the passive wheel, the driving gear, the passive gear, the intermediate gear from deforming by external forces and to prevent foreign objects to be drawn into the obstacle-adaptive mechanism.

The shock absorbing unit comprises a retractable body, a connecting pole, and a fixed pole, the fixed pole is connected to the lower case body, the connecting pole is connected to the driving unit, the retractable body has one end connected to the connecting pole and the other end connected to the fixed pole. When the body moves on a bumpy surface, the shock absorbing unit can absorb the vibration to hold the driving wheel and the passive wheel steady, thereby allowing the body to continue to move towards the obstacle. The shock absorbing unit can use spring as its retractable body.

Furthermore, the body comprises an upper case body and a lower case body to be assembled for providing a containing space, wherein the driving unit and the wheel case unit is disposed within the containing space. The body, upper case body, and lower case body can protect the driving unit and the wheel case unit from being damaged by external force when the driving wheel and the passive wheel are moving, thereby preventing the driving unit, the driving wheel, the passive wheel, the driving gear, the passive gear, and the plurality of intermediate gears from damage.

The present invention discloses an obstacle-adaptive mechanism of a moving device, which uses a driving wheel, a driving gear, a passive wheel, a passive gear and an intermediate gear as a transmission mechanism, while compared to prior art obstacle-adaptive mechanisms using caterpillar bands, the obstacle-adaptive mechanism of the present invention is simple in structure, and is light and agile, it can cross various obstacles without the need of expensive high power driving unit and has lower manufacturing cost. Besides, with the design of a driving wheel and a passive wheel, when any one of the driving wheel and the passive wheel gets stuck by the obstacle, the moving device can still escape from the obstacle by using the other wheel to cross the obstacle, thereby providing the ability of successful crossing of the obstacle-adaptive mechanism of the moving device.

DETAILED DESCRIPTION OF THE PREFERRED EMBODIMENT

Figure 1:
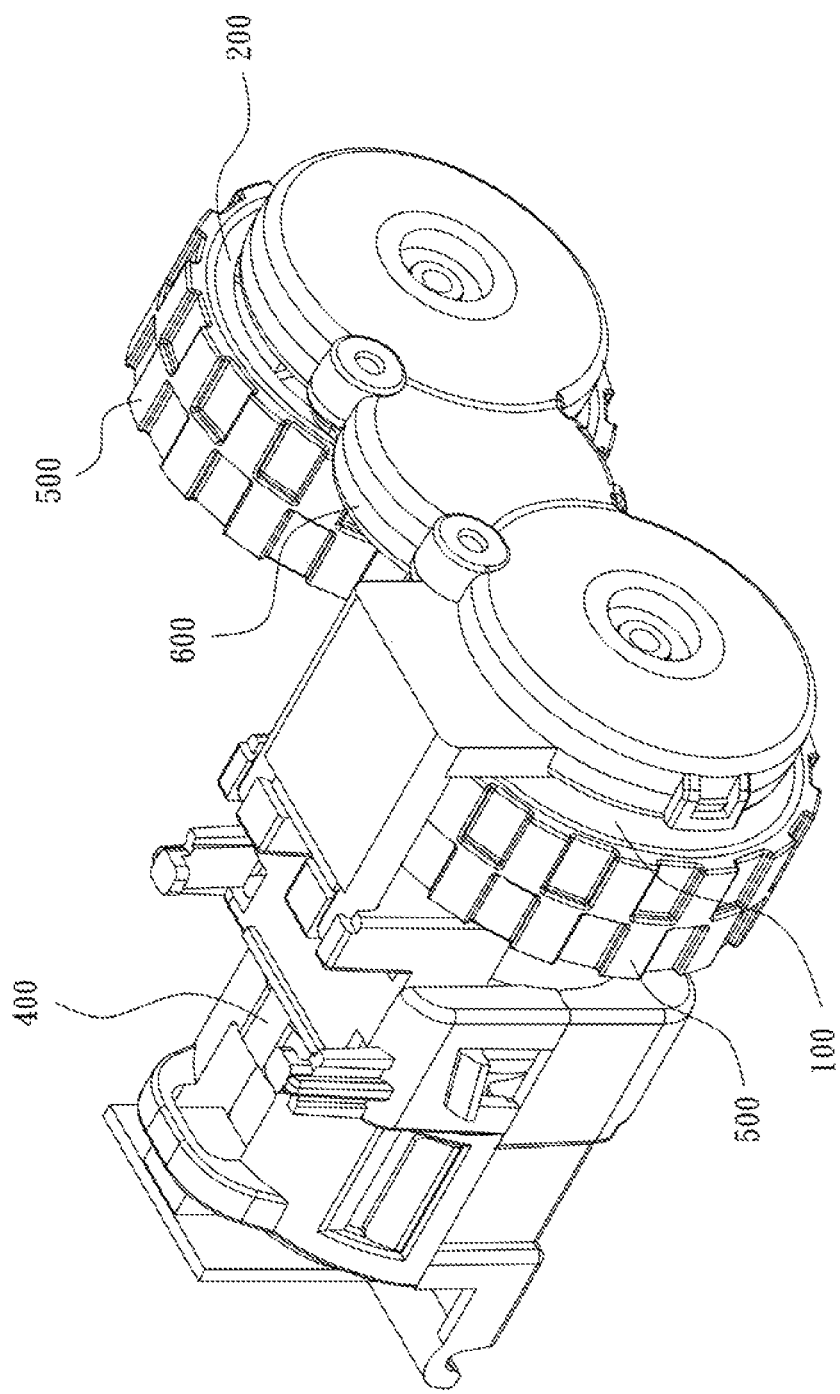
FIG. 1 illustrates a structural view of an obstacle-adaptive mechanism of a moving device of the present invention.
Figure 2:
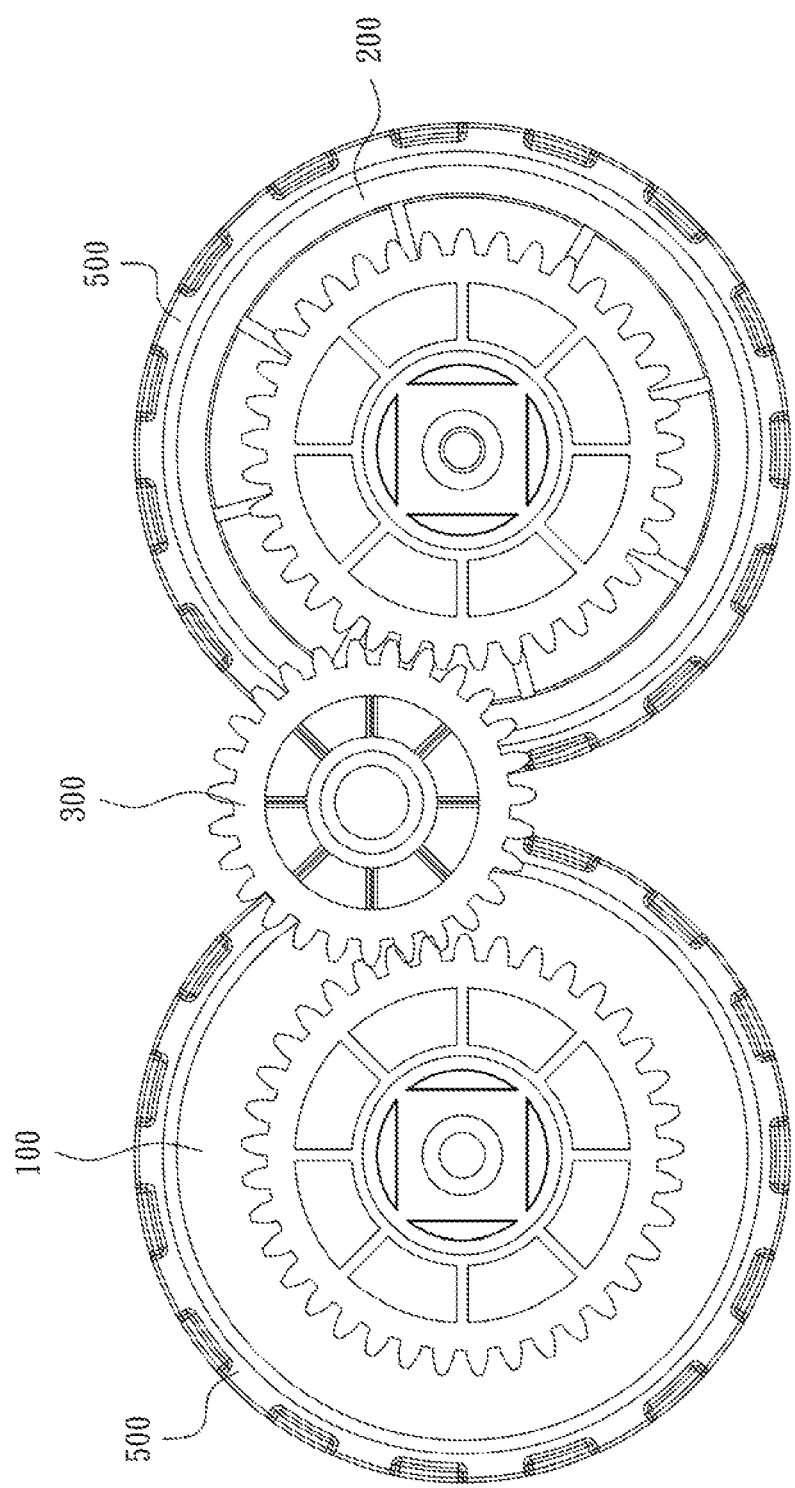
FIG. 2 illustrates another structural view of the obstacle-adaptive mechanism of the moving device of the present invention.
Figure 3:
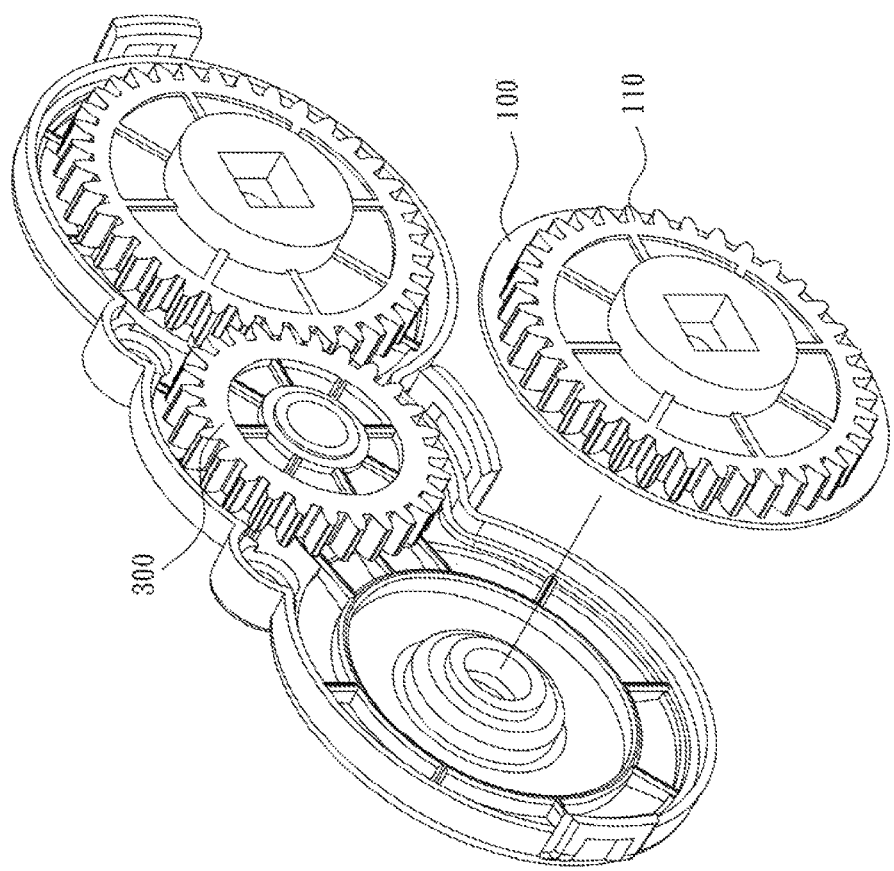
FIG. 3 illustrates still another structural view of the obstacle-adaptive mechanism of the moving device of the present invention.
Figure 4:
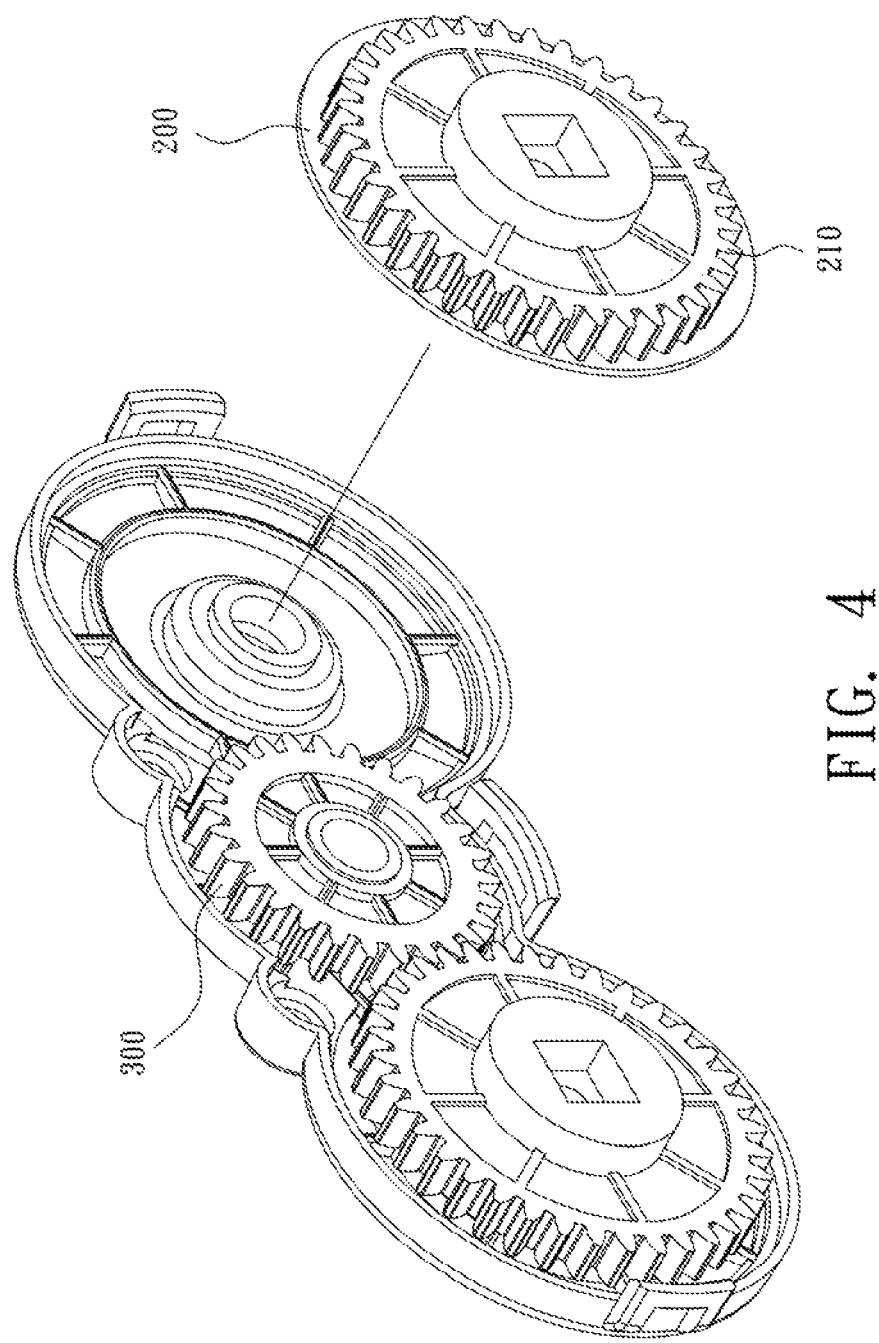
FIG. 4 illustrates still another structural view of the obstacle-adaptive mechanism of the moving device of the present invention.

Please refer to FIG. 1~FIG. 4, an obstacle-adaptive mechanism of a moving device mainly comprises a driving wheel 100, a driving gear 110, a passive wheel 200, a passive gear 210, an intermediate gear 300, a driving unit 400, a tire 500, and a wheel case unit 600. One side of the driving wheel 100 is connected to a driving gear 110, one side of the passive wheel 200 is connected to the passive gear 210, and the intermediate gear 300 is disposed between the driving gear 110 and the passive gear 210. The driving wheel 100 drives the driving gear 110 to rotate the intermediate gear 300; then the intermediate gear 300 drives the passive gear 210 to let the passive wheel 200 rotate with the driving wheel 100 in the same direction. The driving unit 400 is connected to the driving wheel 100 and provides power to the driving wheel 100 to enable the driving wheel 100, and the driving gear 110 drives the intermediate gear 300 to keep the passive gear 210 and the driving gear 110 rotating in the same direction.

Besides, the obstacle-adaptive mechanism of the moving device uses a driving wheel 100, a driving gear 110, a passive wheel 200, a passive gear 210 and an intermediate gear 300 as a transmission mechanism, while compared to prior art obstacle-adaptive mechanisms using caterpillar bands, the transmission mechanism comprising the driving wheel 100, the driving gear 110, the passive wheel 200, the passive gear 210 and the intermediate gear 300 is simple in structure, and is light and agile, it can cross various obstacles without the need of expensive high power driving unit and has low manufacturing cost.

Furthermore, the outer rims of the driving wheel 100 and the passive wheel 200 are disposed with tires 500 to protect the driving wheel and the passive wheel when the driving wheel and the passive wheel are rolling. The tires can protect the driving wheel 100 and the passive wheel 200 by increasing the friction with the ground and reducing the abrasion of the driving wheel 100 and the passive wheel 200. Besides, advantages such as strong grip and large contacting area of the tire 500 can facilitate the rolling speed of the driving wheel 100 and the passive wheel 200 to improve the efficiency of the obstacle-adaptive mechanism of the moving device.

Besides, the driving wheel 100, the driving gear 110, the passive wheel 200, the passive gear 210, and the intermediate gear 300 are disposed in the wheel case unit 60. The wheel case unit 600 can hold the driving wheel 100 and the passive wheel 200 in position to protect the driving wheel 100 and the passive wheel 200, meanwhile, it can also prevent the driving gear 110, the passive gear 210 and the intermediate gear 300 from damages caused by the driving wheel 100 and the passive wheel 200 hitting any foreign objects.

Figure 5:
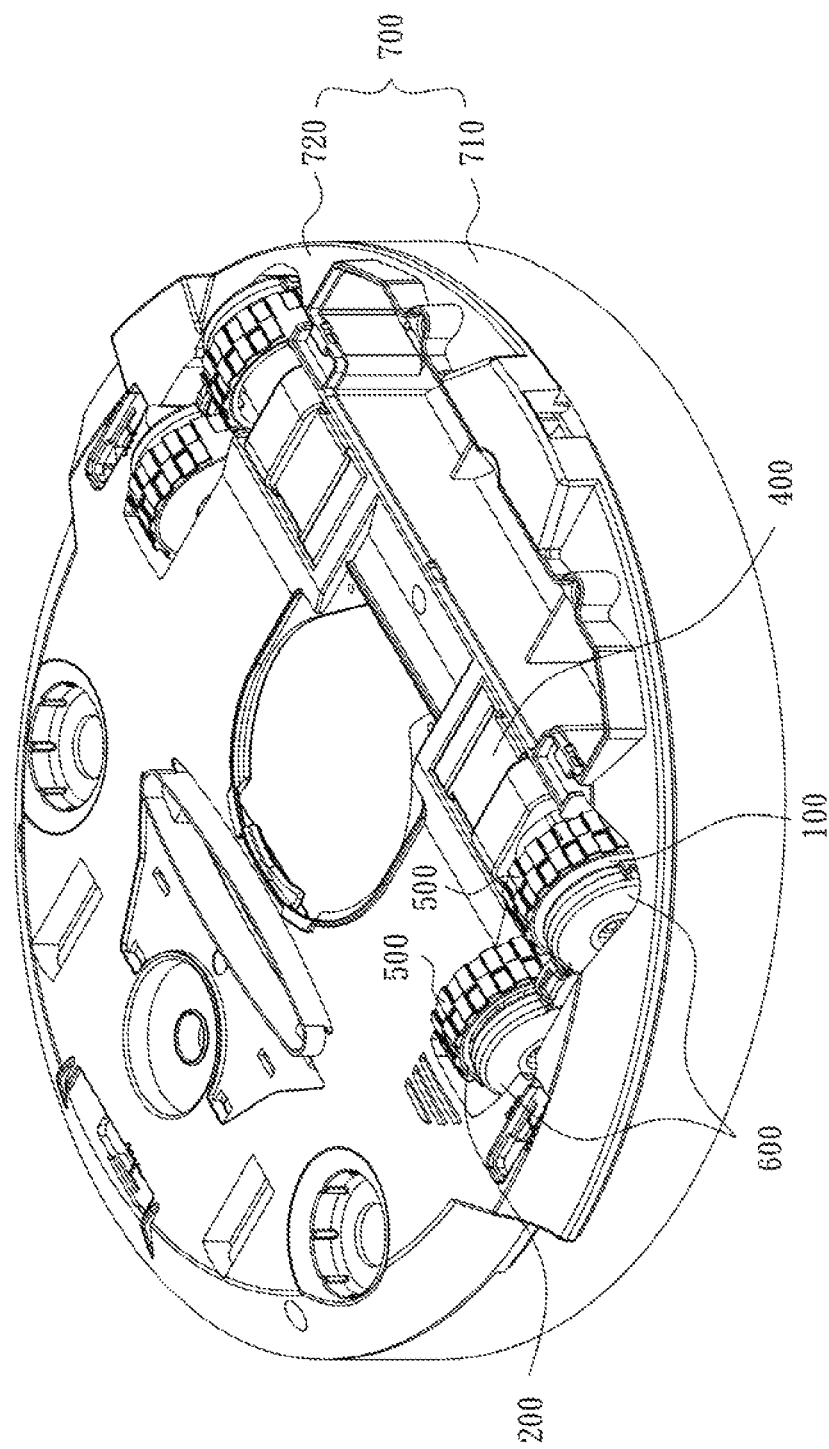
FIG. 5 illustrates still another structural view of the obstacle-adaptive mechanism of the moving device of the present invention.
Figure 6:
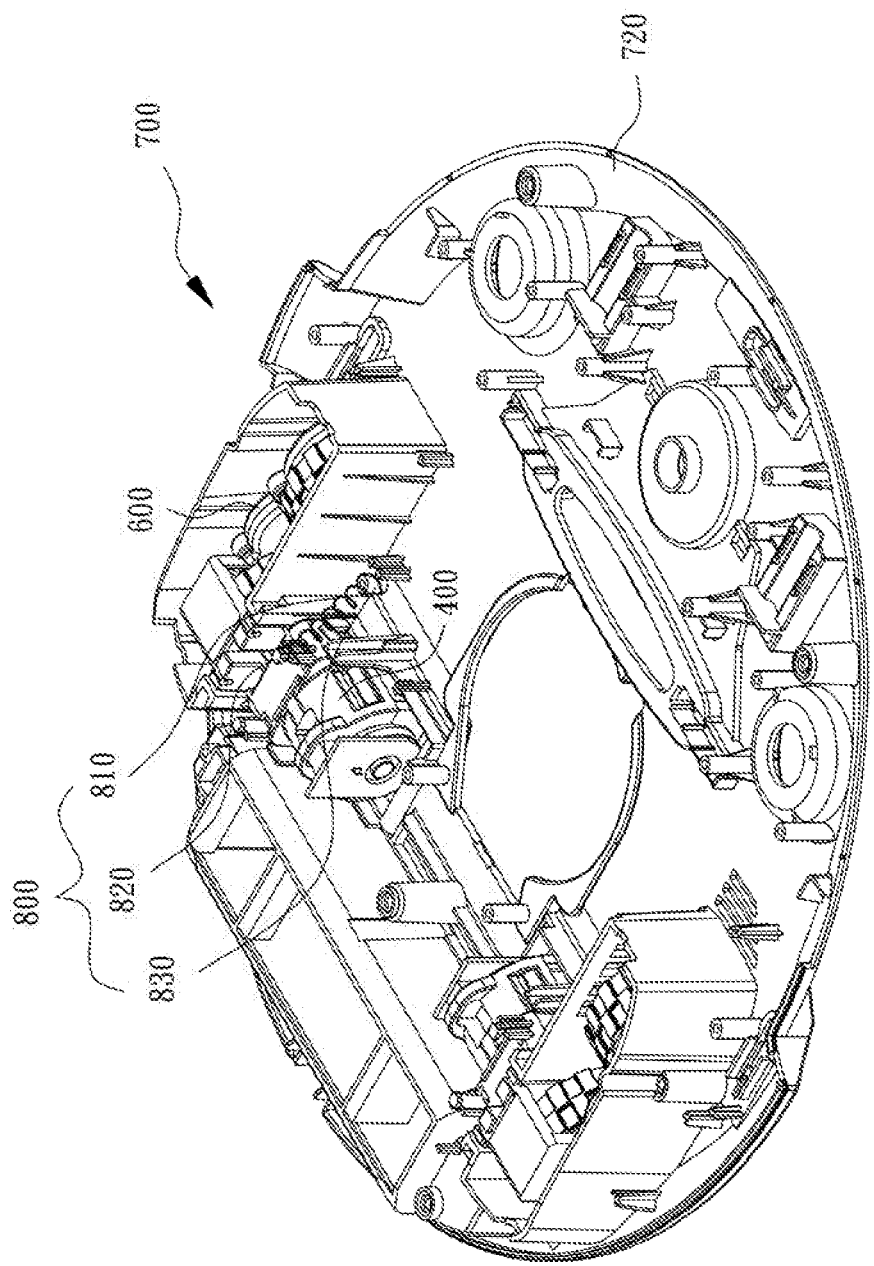
FIG. 6 illustrates still another structural view of the obstacle-adaptive mechanism of the moving device of the present invention.

Please refer to FIG. 5 and FIG. 6, the obstacle-adaptive mechanism of the moving device further comprises a body 700 and shock absorbing unit 800, the body 700 comprises an upper case body 710 and a lower case body 720, the upper case body 710 and the lower case body 720 cab be assembled to provide a containing space, wherein the driving unit 400 and the wheel case unit 600 is disposed within the containing space. When the driving wheel 100 and the passive wheel 200 rotate to move the body 700, the body 700, the upper case body 710, and the lower case body 720 can protect the driving unit 400 and the wheel case unit 600 from being damaged by external force when the driving wheel 100 and the passive wheel 200 bump into some foreign object, thereby preventing the obstacle-adaptive mechanism of moving device from deviating from the original path.

Moreover, the shock absorbing unit 800 comprises the retractable body 810 made of spring, the connecting pole 820 and the fixed pole 830, wherein the retractable body 810 is disposed between the connecting pole 820 and the fixed pole 830, the connecting pole 820 and the fixed pole 830 are disposed on top of the driving unit 400 and the lower case body 720 respectively. When the body moves on a bumpy road through the rotation of the driving wheel 100 and the passive wheel 200, the shock absorbing unit 800 can absorb the vibration to hold the driving wheel 100 and the passive wheel 200 steady, thereby allowing the body 700 to continue to move towards the obstacle.

Figure 7:
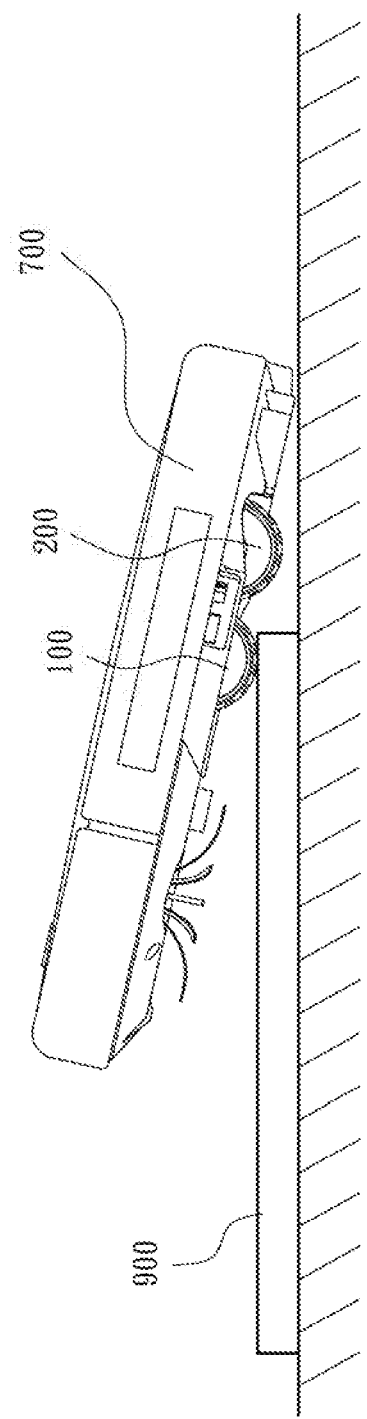
FIG. 7 illustrates a view of the obstacle-adaptive mechanism of the moving device crossing an obstacle.

Please refer to FIG. 7, when the body 700 is crossing the obstacle 900, the driving wheel 100 first crosses over the obstacle 900, then the passive wheel 200 moves towards the obstacle 900 to allow the body 700 to successfully cross the obstacle 900, thereby enhancing the ability of the obstacle-adaptive mechanism of the moving device crossing the obstacle 900.

Figure 8:
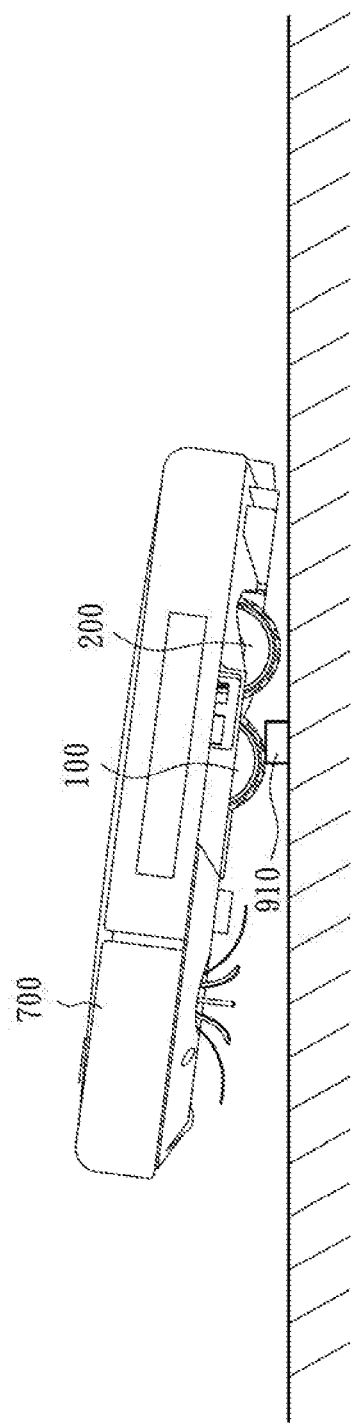
FIG. 8 illustrates another view of the obstacle-adaptive mechanism of the moving device crossing an obstacle.

Please refer to FIG. 8, when the driving wheel 100 of the obstacle-adaptive mechanism of the moving device is stuck by the barrier 910 and the body 700 cannot cross the barrier 910, the driving wheel 100 is enabled to drive the passive wheel 200 to move towards the barrier 910 to help the body 700 cross the barrier 910 successfully while maintains the balance and stability of the body 700 without slipping from the barrier 910, thereby enabling the obstacle-adaptive mechanism of the moving device to provide the effect of crossing the barrier 910.

What is claimed is:

1. An obstacle-adaptive mechanism of a moving device, the obstacle-adaptive mechanism comprising:
   a driving wheel connected to a driving gear;
   a passive wheel connected to a passive gear;
   a single intermediate gear disposed between the driving gear and the passive gear, wherein a diameter of the single intermediate gear is smaller than a diameter of the driving wheel and a diameter of the passive wheel, and the driving wheel drives the driving gear to rotate the intermediate gear, then the intermediate gear drives the passive gear to lead the passive wheel rotate with the driving wheel in the same direction; and
   a driving unit connected to the driving wheel, wherein the driving unit drives the driving wheel to rotate.

2. The obstacle-adaptive mechanism of the moving device as claimed in claim 1, wherein the driving gear and the passive gear rotate in the same direction.

3. The obstacle-adaptive mechanism of the moving device as claimed in claim 1, wherein each one of the driving wheel and the passive wheel is disposed with a tire on an outer rim.

4. The obstacle-adaptive mechanism of the moving device as claimed in claim 1 further comprising a wheel case unit having the driving wheel, the passive wheel, the driving gear, the passive gear, and the intermediate gear disposed within the wheel case unit.

5. The obstacle-adaptive mechanism of the moving device as claimed in claim 4 further comprising a body including an upper case body and a lower case body, wherein the upper case body and the lower case body are assembled to provide a containing space for holding the driving gear and the wheel case unit therein.

6. An obstacle-adaptive mechanism of a moving device, the obstacle-adaptive mechanism comprising:
- a driving wheel connected to a driving gear;
- a passive wheel connected to a passive gear;
- a single intermediate gear disposed between the driving gear and the passive gear, wherein the driving wheel drives the driving gear to rotate the intermediate gear, then the intermediate gear drives the passive gear to lead the passive wheel rotate with the driving wheel in the same direction;
- a driving unit connected to the driving wheel, wherein the driving unit drives the driving wheel to rotate;
- a wheel case unit having the driving wheel, the passive wheel, the driving gear, the passive gear, and the intermediate gear disposed within the wheel case unit;
- a body including an upper case body and a lower case body, wherein the upper case body and the lower case body are assembled to provide a containing space for holding the driving gear and the wheel case unit therein; and
- a plurality of shock absorbing units, each one of the plurality of shock absorbing units comprising a retractable body having one end connected to a connecting pole and the other end connected to a fixed pole, wherein the connecting pole is connected to the top of the driving gear, the fixed pole is connected to the top of the upper case body.

7. The obstacle-adaptive mechanism of the moving device as claimed in claim 6, wherein the retractable body is a spring.

* * * * *